US009116402B2

(12) United States Patent
Takeda et al.

(10) Patent No.: US 9,116,402 B2
(45) Date of Patent: Aug. 25, 2015

(54) LIQUID CRYSTAL DISPLAY DEVICE (71) Applicant: Japan Display Inc., Tokyo (JP)

(72) Inventors: Arihiro Takeda, Saitama-ken (JP); Jin Hirosawa, Saitama-ken (JP); Tetsuya Ilzuka, Ishikawa-ken (JP); Hirokazu Morimoto, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 286 days.

(21) Appl. No.: 13/896,725

(22) Filed: May 17, 2013

(65) Prior Publication Data
US 2013/0314635 A1 Nov. 28, 2013

(30) Foreign Application Priority Data

May 25, 2012 (JP) ................................. 2012-119499

(51) Int. Cl.
*G02F 1/1343* (2006.01)
*G02F 1/1362* (2006.01)

(52) U.S. Cl.
CPC .... *G02F 1/136286* (2013.01); *G02F 1/134363* (2013.01); *G02F 1/136213* (2013.01); *G02F 2001/134381* (2013.01); *G02F 2001/136218* (2013.01); *G02F 2201/121* (2013.01)

(58) Field of Classification Search
CPC ..................... G02F 1/136286; G02F 1/136213
USPC .......................................................... 349/39
See application file for complete search history.

(56) References Cited

U.S. PATENT DOCUMENTS

| 6,266,116 B1 | 7/2001 | Ohta et al. |
| 2001/0010575 A1 | 8/2001 | Yoshida et al. |
| 2004/0165136 A1 | 8/2004 | Sugiyama et al. |
| 2005/0206824 A1 | 9/2005 | Son et al. |

(Continued)

FOREIGN PATENT DOCUMENTS

| JP | 6-222397 | 8/1994 |
| JP | 7-159807 | 6/1995 |

(Continued)

OTHER PUBLICATIONS

Fujimoto et al. "High-Performance, Vertical-Type Organic Transistors with Built-In Nanotriode Arrays," Jan. 25, 2007 Advance Material, Adv. Mater. 2007, 19, 525-530.*
U.S. Appl. No. 14/070,969, filed Nov. 4, 2013, Takeda et al.

*Primary Examiner* — Bumsuk Won
*Assistant Examiner* — Edmond Lau
(74) *Attorney, Agent, or Firm* — Oblon, McClelland, Maier & Neustadt, L.L.P.

(57) ABSTRACT

An array substrate includes a gate line extending in a first direction, a source line extending in a second direction orthogonally crossing the first direction and an auxiliary capacitance line having a trunk portion extending in the first direction so as to cross the source line and a branch portion branched from the trunk portion and extending along the source line. A switching element includes a drain line arranged under the auxiliary capacitance line so as to face the trunk portion and the branch portion thereof. A pixel electrode includes a main pixel electrode extending substantially in parallel to the source line and a contact portion electrically connected with the drain line. A counter substrate includes a couple of main common electrodes extending substantially in parallel to the main pixel electrode on the both sides sandwiching the main pixel electrode.

16 Claims, 7 Drawing Sheets

(56) References Cited

U.S. PATENT DOCUMENTS

| | | |
|---|---|---|
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2011/0085121 A1* | 4/2011 | Jeon et al. .................. 349/141 |
| 2012/0099070 A1* | 4/2012 | Hirosawa et al. ........... 349/143 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

* cited by examiner

FIG. 7

LIQUID CRYSTAL DISPLAY DEVICE

CROSS-REFERENCE TO RELATED APPLICATION

This application is based upon and claims the benefit of priority from prior Japanese Patent Application No. 2012-119499 filed May 25, 2012, the entire contents of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, structures using lateral electric field, such as IPS (In-Plane Switching) mode and FFS (Fringe Field Switching) mode, attract attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: an array substrate including; a gate line extending in a first direction, a source line extending in a second direction orthogonally crossing the first direction, an auxiliary capacitance line having a trunk portion extending in the first direction so as to cross the source line and a branch portion branched from the trunk portion and extending along the source line, a switching element formed in a region in which the source line crosses the gate line each other, the switching element including a drain line extending under the source line and arranged under the auxiliary capacitance line so as to face the trunk portion and the branch portion thereof, and a pixel electrode having a main pixel electrode extending substantially in parallel to the source line and a contact portion electrically connected with the drain line, a counter substrate having a couple of main common electrodes extending substantially in parallel to the main pixel electrode on the both sides sandwiching the main pixel electrode; and a liquid crystal layer held between the array substrate and the counter substrate and containing liquid crystal molecules.

Figure 1:
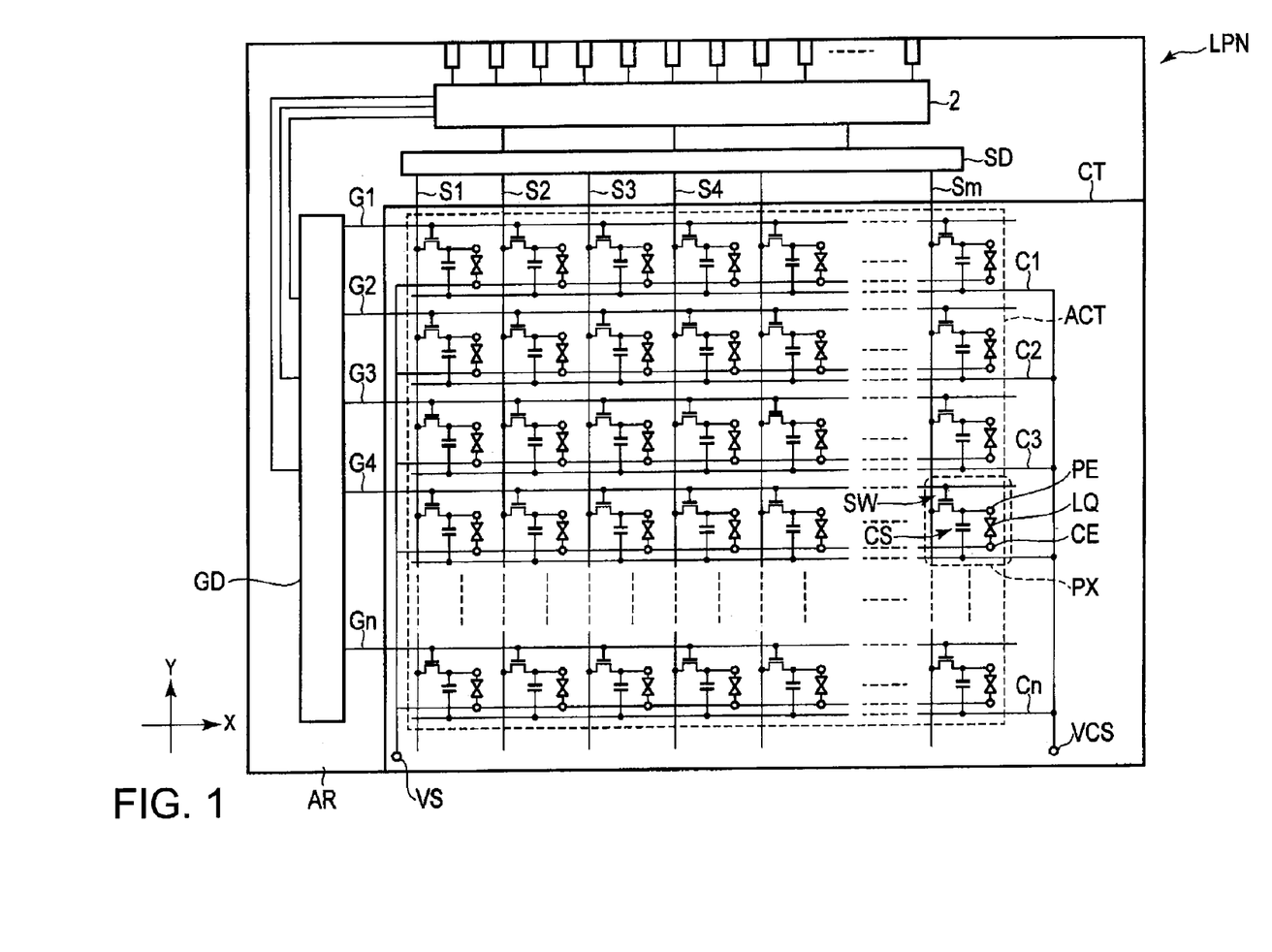
FIG. 1 is a figure schematically showing a structure and the equivalent circuit of a liquid crystal display device according to one embodiment.

FIG. 1 is a figure schematically showing a structure and the equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers). In an active area ACT, the dot pitch in a direction substantially crossing the longitudinal direction of the pixel is approximately 25 µm according to this embodiment.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C linearly extend in a first direction X, respectively. The gate line G and the auxiliary capacitance line C are arranged in turns along a second direction Y that orthogonally intersects the first direction X. The source lines S cross the gate line G and the auxiliary capacitance line C. The source lines S linearly extend in the second direction Y, respectively. The gate line G, the auxiliary capacitance line C and the source lines S do not necessarily extend linearly, and a portion thereof may be crooked partially.

Each gate line G is pulled out to the outside of the active area ACT and connected to a gate driver GD. Each source line S is pulled out to the outside of the active area ACT and connected to a source driver SD. At least a portion of the gate driver GD and the source driver SD is formed in the array substrate AR, for example, and connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least a portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to the principle surfaces of the substrates or a lateral electric field substantially in parallel with the principal surface of the array substrate AR or the counter substrate CT.

The switching element SW is constituted by an n channel type thin film transistor (TFT), for example. The switching element SW is electrically connected with the gate line G and the source line S. The switching element SW may be either a top-gated type or a bottom-gated type. Though the semiconductor layer of the switching element SW is formed of polysilicon, the semiconductor layer may be formed of amorphous silicon.

The pixel electrode PE is arranged in each pixel PX and electrically connected with the switching element SW. The common electrode CE of common potential is arranged in common to the plurality of pixel electrodes PE through the liquid crystal layer LQ. Though the pixel electrode PE and the common electrode CE are formed of light transmissive conductive materials such as Indium Tin Oxide (ITO), Indium Zinc Oxide (IZO), etc., other materials such as aluminum may be used.

The array substrate AR includes an electric power supply portion VS formed outside of the active area ACT for impressing a voltage to the common electrode CE. Furthermore, the common electrode CE is drawn to outside of the active area ACT and electrically connected with an electric power supply portion VS formed in the array substrate AR through an electrically conductive component which is not illustrated.

Figures 2A, 2B, 2C:
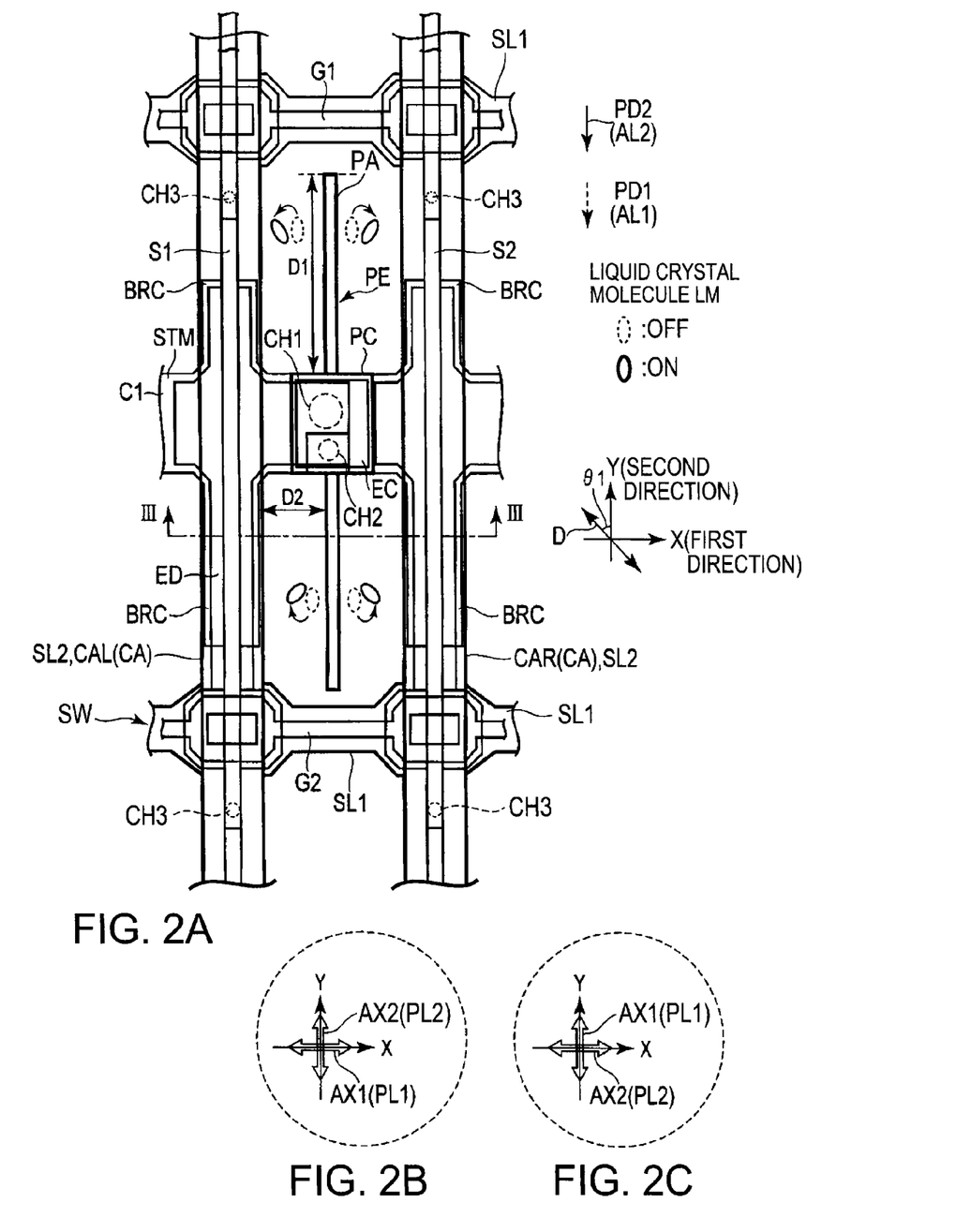
FIG. 2A is a plan view schematically showing a structure of a pixel when a display panel shown in FIG. 1 is seen from a counter substrate side according to a first embodiment.
FIGS. 2B and 2C are views showing polarizing axis directions of polarization plates.

FIG. 2A is a plan view schematically showing a structure of a pixel when a display panel shown in FIG. 1 is seen from a counter substrate side according to a first embodiment. Here, the plan view in a X-Y plane is shown.

The illustrated pixel PX has the shape of a rectangle whose length in the first direction X is shorter than the length in the second direction Y. A gate line G1 and a gate line G2 extend along the first direction X. The auxiliary capacitance line C1 is arranged between the adjoining gate line G1 and gate line G2, and extends along the first direction X. A source line S1 and a source line S2 extend along the second direction Y. A pixel electrode PE is arranged between the adjoining source line S1 and source line S2. Moreover, the pixel electrode PE is located between the gate line G1 and the gate line G2.

In the illustrated example, the source line S1 is arranged at the left-hand side end, and the source line S2 is arranged at the right-hand side end in each pixel PX. Strictly, the source line S1 is arranged striding over a boundary between the illustrated pixel and an adjoining pixel PX on its left-hand side, and the source line S2 is arranged striding over a boundary between the illustrated pixel and an adjoining pixel PX on its right-hand side. Moreover, the gate line G1 is arranged at the upper end portion, and the gate line G2 is arranged at the bottom end portion in each pixel PX. Strictly, the gate line G1 is arranged striding ranging over a boundary between the illustrated pixel and an adjoining pixel PX on its upper portion, and the gate line G2 is arranged striding over a boundary between the illustrated pixel and an adjoining pixel PX on its bottom portion. One auxiliary capacitance line C1 is arranged substantially in the central portion of the pixel PX. The auxiliary capacitance line C1 includes a trunk portion STM extending substantially in parallel with the gate line G1 and the gate line G2, and a branch portion BRC extending from the trunk portion STM along the source lines S1 and S2 toward the gate line G1 and gate line G2. In the branch portion BRC of the auxiliary capacitance line C1, the width in the first direction X is larger than the width of the source lines S1 and S2.

The gate lines G1 and G2 are branched into two lines extending in the first direction X in a region in which the gate lines G1 and G2 cross with the source lines S1 and S2 to form a double gate transistor. In the branched region, the source lines S1 and S2 counter with the branched gate lines G1 and G2 in which the width in the second direction Y is formed greatly so as to shade the branched gate lines G1 and G2.

The switching element SW is electrically connected with the gate line G2 and the source line S1 in the illustrated example. The switching element SW is formed in an intersection of the gate line G2 with the source line S1. A drain line ED extends along the source line S1 and the auxiliary capacitance line C1. In contact holes CH1 and CH2 formed in a region which overlaps with the trunk portion STM of the auxiliary capacitance line C1, the drain line ED is electrically connected with the pixel electrode PE through a contact electrode EC. The auxiliary capacitance line C1 is removed partially in a region in which the contact hole CH1 is formed to connect the drain line ED with the contact electrode EC. In the contact hole CH1, the drain line ED is electrically connected with the contact electrode EC, and further the contact electrode EC is electrically connected with the pixel electrode PE in the contact hole CH2.

A source electrode of the switching element SW is electrically connected with the source line S1 in a contact hole CH3 arranged beyond the gate line G2. The drain line ED extends along the source line S1 to the auxiliary capacitance line C1 formed under the source line S1, and further extends so that the drain line ED counters with the branch portion BRC and the trunk portion STM of the auxiliary capacitance line C1. That is, the drain line ED is formed with poly-silicon, and extends along the source line S1 so as to counter with the branch portion BRC of the auxiliary capacitance line C1. The drain line ED extends in the right and left of the source line S1 facing the trunk portion STM of the auxiliary capacitance line C1. Auxiliary capacitance CS is formed in the region in which the auxiliary capacitance line C1 and the drain line ED counter.

Since the auxiliary capacitance CS can be formed in the region in which the branch portion BRC of the auxiliary capacitance line C1 and the drain line ED counter by branching the auxiliary capacitance line C1 along the source line 51 and the source line S2, the width of the trunk portion STM in the second direction Y of the auxiliary capacitance line C1 extending in the first direction X can be made small. Thus, sufficient auxiliary capacitance CS can be obtained in the region in which the branch portion BRC and the trunk portion STM of the auxiliary capacitance line C1 counter the drain line ED. In addition, the width of the trunk portion STM of the auxiliary capacitance line C1 in the second direction Y may have the minimum size required for forming the contact holes CH1 and CH2 which connect the pixel electrode PE with the drain line ED of the switching element SW.

The pixel electrode PE is equipped with a main pixel electrode PA and a contact portion PC which are electrically connected mutually. The main pixel electrode PA linearly extends from the contact portion PC along the second direction Y to near an upper end portion and a bottom end portion of the pixel PX. The main pixel electrode PA is formed in the shape of a belt having substantially the same width in the first direction X. The contact portion PC is located in a region which overlaps with the auxiliary capacitance line C1, and electrically connected with the switching element SW through the contact holes CH1 and CH2. The contact portion PC is formed more broadly than the main pixel electrode PA. The width in the first direction X and the second direction Y of the contact portion PC may have the minimum size required for connecting the pixel electrode PE with the switching element SW by the contact holes CH1 and CH2.

The pixel electrode PE is arranged in an approximately middle portion between the source line S1 and the source line S2, i.e., the center of pixel PX. The interval between the source line S1 and the pixel electrode PE in the first direction X is substantially the same as the interval between the source line S2 and the pixel electrode PE in the first direction X.

In this embodiment, since the branch portion BRC of the auxiliary capacitance line C1 is branched along the source line S1 and the source line S2, the width of the trunk portion STM of the auxiliary capacitance line C1 in the second direction Y is the minimum width required for forming the contact holes CH1 and CH2. Therefore, the width in the second direction Y of the region in which the pixel electrode PE and contact portion PC overlap can also be made small, and the length D1 of the main pixel electrode PA may be enlarged in the second direction Y as much as is reduced in the contact portion PC.

The common electrode CE is equipped with a main common electrode CA. The main common electrode CA extends substantially linearly in the second direction Y in parallel with the main pixel electrode PA on the both sides which sandwich the main pixel electrodes PA in the X-Y plane. That is, the main common electrode CA extends substantially in parallel with the main pixel electrode PA while countering with the source lines S, respectively. The main common electrode CA is formed in the shape of a belt with substantially the same width along the first direction X.

In the illustrated example, the main common electrode CA is located in two lines in parallel along the first direction X, and arranged on the right-and-left both ends of the pixel PX, respectively. Hereinafter, in order to distinguish the two main common electrodes CA, the main common electrode on the left-hand side in the figure is called CAL, and the main common electrode on the right-hand side in the figure is called CAR. The main common electrode CAL counters with the source line S1, and the main common electrode CAR counters with the source line S2. The width of the main common electrode CAL in the first direction X is larger than the width of the source line S1, and the width of the main common electrode CAR in the first direction X is also larger than the width of the source line S2. In this embodiment, the width of the main common electrodes CAL and the main common electrode CAR is substantially the same as the width of the branch portion BRC of the auxiliary capacitance line C1 and the width of the drain line ED. In the active area or out of the active area, the main common electrode CAL and the main common electrode CAR are electrically connected each other.

In each pixel PX, the main common electrode CAL is arranged at the left-hand side end, and the main common electrode CAR is arranged at the right-hand side end. Strictly, the main common electrode CAL is arranged striding over a boundary between the illustrated pixel and an adjoining pixel PX on its left-hand side, and the main common electrode CAR is arranged striding over a boundary between the illustrated pixel and an adjoining pixel PX on its right-hand side.

If its attention is paid to the positional relationship between the pixel electrode PE and the main common electrode CA, the pixel electrode PE and the main common electrode CA are arranged by turns along the first direction X. The pixel electrodes PE and the main common electrode CA are arranged substantially in parallel each other. At this time, neither of the main common electrode CA overlaps the pixel electrode PE in the X-Y plane.

The pixel electrode PE is located between the adjoining main common electrode CAL and the main common electrode CAR. That is, the main common electrode CAL and the main common electrode CAR are arranged on the both sides which sandwich the position right above the pixel electrode PE. That is, the pixel electrode PE is arranged between the main common electrode CAL and the main common electrode CAR. For this reason, the main common electrode CAL, the main pixel electrode PA, and the main common electrode CAR are arranged along the first direction X in this order.

The interval between the pixel electrode PE and the common electrodes CE in the first direction X is substantially the same. Namely, the intervals between the main common electrode CAL and the main pixel electrode PA, and between the main common electrode CAR and the main pixel electrode PA in the first direction X are substantially the same. In this embodiment, the interval between the main common electrode CA and the main pixel electrode PA in the first direction X, i.e., the distance between edges of the main pixel electrode PA and the main common electrode CA facing mutually in the first direction X is called a lateral inter-electrode distance D2.

Figure 3:
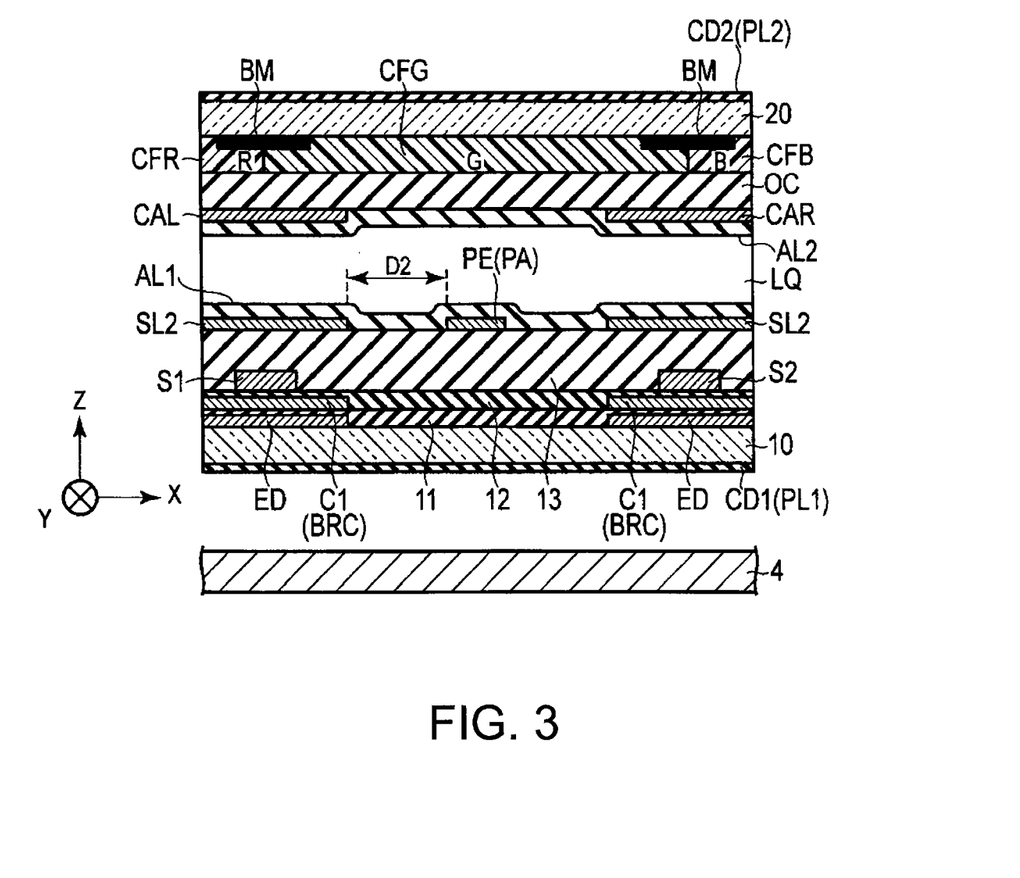
FIG. 3 is a cross-sectional view schematically showing the structure of the liquid crystal display panel taken along line III-III shown in FIG. 2A.

FIG. 3 is a cross-sectional view schematically showing the structure of the liquid crystal display panel taken along line III-III shown in FIG. 2A. In addition, only the portion required for explanation is illustrated here.

A backlight 4 is arranged on the back side of the array substrate AR. Various types of backlights can be used. For example, a light emitting diode (LED) and a cold cathode fluorescent lamp (CCFL), etc., can be applied as a light source of the backlight 4, and the explanation about its detailed structure is omitted.

The array substrate AR is formed using a first insulating substrate 10 which has a light transmissive characteristics. The drain line ED is formed on the first insulating substrate 10 and covered with a first interlayer insulating film 11. The auxiliary capacitance line C1 is formed on the first interlayer insulation film 11 and covered with a second interlayer insulating film 12. The source line S is formed on the second interlayer insulating film 12 and covered with a third interlayer insulating film 13. The gate line which is not shown is arranged in the same layer as the auxiliary capacitance line C1, for example. The pixel electrode PE is formed on the third interlayer insulating film 13. The pixel electrode PE is arranged between the positions right above the respective source lines S.

The first alignment film AL1 is arranged on the array substrate AR facing the counter substrate CT, and extends to whole active area ACT. The first alignment film AL1 covers the pixel electrode PE, etc., and is also arranged on the second interlayer insulating film 12. The first alignment film AL1 is also formed of material which shows a horizontal alignment characteristics.

In addition, the array substrate AR may be further equipped with a portion of the common electrodes CE. In this embodiment, a shield layer SL1 which is a portion of the common electrodes CE is arranged on the third interlayer insulating film 13 so as to counter with the gate line G. A shield layer SL2 which is a portion of the common electrode CE is arranged so as to face the source line S (or the main common electrode CA).

The shield layer SL1 extends in a direction which intersects the main common electrode CA, and the potential thereof is the same as the potential of the main common electrode CA. It is possible to shield undesirable electric field from the gate line G and the auxiliary capacitance line C by providing the shield layer SL1. The shield layer SL2 extends substantially in parallel with the main common electrode CA, and the potential thereof is the same as the potential of the main common electrode CA. It is possible to shield undesirable electric field from source line S by providing the second shield layer SL2. According to the structure equipped with the shield layer SL1 and the shield layer SL2, it becomes possible to control degradation of display grace further.

The counter substrate CT is formed using a second insulating substrate 20 which has a transmissive characteristics. The counter substrate CT includes a black matrix BM, a color filter CF, an overcoat layer OC, the common electrode CE, and a second alignment film AL2, etc.

The black matrix BM forms an aperture portion AP by defining each pixel PX. That is, the black matrix BM is arranged so that wiring portions, such as the source line S, the gate line G, the auxiliary capacitance line C1, and the switching element SW, may counter the black matrix BM. Herein, though only a portion of the black matrix BM extending along the second direction Y is shown, the black matrix BM may include a portion extending along the first direction X. The black matrix BM is formed on an internal surface 20A of the second insulating substrate 20 facing the array substrate AR.

The color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in the adjoining pixels PX in the first direction X differ mutually. For example, the color filters CF are formed of resin materials colored by three primary colors of red, blue, and green, respectively. The red color filter formed of resin material colored in red is arranged corresponding to the red pixel. The blue color filter formed of resin material colored in blue is arranged corresponding to the blue pixel. The green color filter formed of resin material colored in green is arranged corresponding to the green pixel. The boundary between the adjoining color filters CF is located in a position which overlaps with the black matrix BM.

The overcoat layer OC covers the color filter CF. The overcoat layer OC eases influence by unevenness of the surface of the color filter CF. For example, the overcoat layer OC is formed of a transparent resin.

The main common electrode CE is formed on the overcoat layer OC facing the array substrate AR. The distance between the common electrode CE and the pixel electrode PE along a third direction Z is uniform. The third direction Z is a direction which crosses the first direction X and the second direction Y, i.e., a normal line direction of the liquid crystal display panel LPN.

The second alignment film L2 is arranged on the counter substrate CT facing the array substrate AR and extends to whole active area ACT. The second alignment film L2 covers the main common electrode CE and the overcoat layer OC, etc. The second alignment film L2 is formed of the material which shows horizontal alignment characteristics.

An alignment treatment (for example, rubbing processing or light alignment processing) is performed to the first alignment film AL1 and the second alignment film AL2 to initially align the molecules of the liquid crystal layer LQ. A first alignment treatment direction PD1 in which the first alignment film AL1 initially aligns the molecules is in parallel with, and a same direction or opposite direction to a second alignment treatment direction PD2 in which the second alignment film AL2 initially aligns the molecules. For example, as shown in FIG. 2A, the first alignment treatment direction PD1 and the second alignment treatment direction PD2 are in parallel with the second direction Y and the same directions each other.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 µm cell gap is formed. The array substrate AR and the counter substrate CT are pasted together by seal material SB arranged outside the active area ACT while the predetermined cell gap is formed.

The liquid crystal layer LQ is held at the cell gap formed between the array substrate AR and the counter substrate CT and arranged between the first alignment film AL1 and the second alignment film AL2. The liquid crystal layer LQ contains liquid crystal molecules. The liquid crystal layer LQ is constituted by liquid crystal material having positive dielectric anisotropy (positive type).

A first optical element OD1 is attached on an external surface 10B of the array substrate AR, i.e., the external surface 10B of the first insulating substrate 10 which constitutes the array substrate AR, by adhesives, etc. The first optical element OD1 is located on a side which counters with the backlight 4 of the liquid crystal display panel LPN, and controls the polarization state of incident light which enters into the liquid crystal display panel LPN from the backlight 4. The first optical element OD1 includes a first polarization plate PL1 having a first polarizing axis (or first absorption axis) AX1.

A second optical element OD2 is attached on an external surface of the counter substrate CT, i.e., the external surface 20B of the second insulating substrate 20 which constitutes the counter substrate CT by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis (or second absorption axis) AX2.

The first polarizing axis AX1 of the first polarization plate PL1 and the second polarizing axis AX2 of the second polarization plate PL2 are arranged in the positional relationship of Cross Nicol. In this state, one polarization plate is arranged so that the polarizing axis becomes in parallel with or orthogonally crosses the initial alignment direction, i.e., the first treatment direction PD1 or the second treatment direction PD2. That is, when the initial alignment direction is in parallel to the second direction Y, the polarizing axis of the one polarization plate is substantially in parallel with the second direction Y or the first direction X.

In FIG. 2B, the first polarization plate PL1 is arranged so that the first polarizing axis AX1 orthogonally crosses the initial alignment direction of the liquid crystal material LM (the second direction Y), i.e., in parallel with the first direction X. The second polarization plate PL2 is arranged so that the second polarizing axis AX2 becomes in parallel with the initial alignment direction of the liquid crystal material LM (second direction Y).

In FIG. 2C, the second polarization plate PL2 is arranged so that the second polarizing axis AX2 orthogonally crosses the initial alignment direction of the liquid crystal material LM (the second direction Y), i.e., in parallel with the first direction X. The first polarization plate PL1 is arranged so that the first polarizing axis AX1 becomes in parallel with the initial alignment direction of the liquid crystal material LM (second direction Y).

Next, the operation of the liquid crystal display panel LPN of the above structure is explained referring to FIGS. 2 and 3.

At the time of non-electric field state (OFF), i.e., when a potential difference (i.e., electric field) is not formed between the pixel electrode PE and the common electrode CE, the liquid crystal molecules LM of the liquid crystal layer LQ are aligned so that their long axes are aligned in a parallel direction with the first alignment direction PD1 of the first alignment film AL1 and the second alignment direction PD2 of the second alignment film AL2 as shown with a dashed line in the figure. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with the X-Y plane and explained as what rotates in a field in parallel with the X-Y plane.

Here, both of the first alignment treatment direction PD1 of the first alignment film AL1 and the second alignment treatment direction PD2 of the second alignment film AL2 are directions in parallel to the second direction Y. At the time of OFF, the long axis of the liquid crystal molecule LM is aligned substantially in parallel to the second direction Y as shown with the dashed line in FIG. 2A. That is, the direction of the initial alignment of the liquid crystal molecule LM is in parallel to the second direction Y or makes an angle 0° with the second direction Y.

When the respective first alignment treatment direction PD1 and second alignment treatment direction PD2 are in parallel and the same directions each other as shown in the figure, the liquid crystal molecule LM is aligned with an approximately horizontal direction (i.e., the pre tilt angle is approximately zero) in a cross-section of the liquid crystal layer LQ in the intermediate portion of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment).

Here, the liquid crystal molecule LM near the first alignment direction AL1 is aligned to the first alignment treatment direction PD1 by carrying out the alignment treatment of the first alignment AL1 in the first alignment treatment direction PD1. Similarly, the liquid crystal molecule LM near the second alignment direction AL2 is aligned to the second alignment treatment direction PD2 by carrying out the alignment treatment of the second alignment AL2 in the second alignment treatment direction PD2. When the respective first alignment treatment direction PD1 and second alignment treatment direction PD2 are in parallel and the same directions each other as shown in the figure, the liquid crystal molecule LM is aligned in the splay alignment state. The alignment of the liquid crystal molecule LM near the first alignment film AL1 on the array substrate AR and the second alignment film AL2 on the counter substrate CT becomes symmetrical with respect to the intermediate portion of the liquid crystal layer LQ. Thus, in the splay alignment state, the display is optically compensated even in an inclining direction from the normal line of the substrate by the liquid crystal molecules LM near the first alignment film AL1 and the second alignment film AL2. Therefore, when the respective first alignment treatment direction PD1 and second alignment treatment direction PD2 are in parallel and the same directions each other, there are few optical leaks in a black display. Accordingly, a high contrast ratio can be achieved, and it becomes possible to improve display grace.

In addition, when both of the first and second alignment treatment directions PD1 and PD2 are in parallel and opposite directions each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment).

A portion of the backlight from the backlight 4 penetrates the first polarizing plate PL1, and enters into the liquid crystal display panel LPN. The polarized state of the incident light to the liquid crystal display panel LPN depends on the alignment state of the liquid crystal molecule LM when passing the liquid crystal layer LQ. At the time OFF, the polarized light which penetrates the liquid crystal display panel LPN is absorbed by the second polarization plate PL2 (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the long axis rotates in parallel with the X-Y plane as shown in a solid line in the figure.

In FIG. 2A, the liquid crystal molecule LM in the region surrounded with the main pixel electrode PE, the contact portion PC, the main common electrode CAL, and the gate line G1 rotates counterclockwise to the second direction Y, and the liquid crystal molecule LM is aligned so that it may turn to the upper left in the figure. The liquid crystal molecule LM in the region surrounded with the pixel electrode PE, the contact portion PC, the main common electrode CAR, and the gate line G1 rotates clockwise to the second direction Y, and the liquid crystal molecule LM is aligned so that it may turn to the upper right in the figure. The liquid crystal molecule LM in the region surrounded with the main pixel electrode PE, the contact portion PC, the main common electrode CAL, and the gate line G2 rotates clockwise to the second direction Y, and the liquid crystal molecule LM is aligned so that it may turn to the lower left in the figure. The liquid crystal molecule LM in the region surrounded with the main pixel electrode PE, the contact portion PC, the main common electrode CAR, and the gate line G2 rotates counterclockwise to the second direction Y, and the liquid crystal molecule LM is aligned so that it may turn to the lower right in the figure.

Thus, in each pixel PX, in case electric field is formed between the pixel electrode PE and the common electrode CE, the alignment direction of the liquid crystal molecule LM is divided into a plurality of directions by the position which overlaps with the pixel electrode PE, and a plurality of domains are formed in each alignment direction. That is, a plurality of domains is formed in one pixel PX.

At the time of ON, a portion of the backlight which entered in the liquid crystal panel LPN from the backlight 4 penetrates the first polarization plate PL1 and passes the liquid crystal panel LPN. The polarized state of the backlight which entered in the liquid crystal layer LQ changes. At the time of ON, at least a portion of the backlight which passes the liquid crystal layer LQ penetrates the second polarization plate PL2 (white display).

At the time OFF, the liquid crystal molecule LM is initially aligned substantially in the second direction Y. In the ON state when potential difference is formed between the pixel electrode PE and the common electrode CE, the optical modulation rate of the liquid crystal layer LQ becomes the highest, that is, the transmissivity in the aperture portion AP becomes the largest when director of the liquid crystal molecule LM (or the direction of the long axis of the liquid crystal molecule LM) in the X-Y plane is shifted by approximately 45° with respect to the first polarization axis AX1 of the first polarization plate PL1 and the second polarization axis AX2 of the second polarization plate PL2.

In the ON state, the director of the liquid crystal molecule LM between the main common electrode CAL and the pixel electrode PE becomes substantially in parallel with a direction of 45°-225° in the X-Y plane, and the director of the liquid crystal molecule LM between the main common electrode CAR and the first pixel electrode PE becomes substantially in parallel with a direction of 135°-315° in the X-Y plane. At this time, peak transmissivity is obtained. If its attention is paid to a transmissivity distribution in each pixel PX, while transmissivity becomes substantially zero on the pixel electrode PE and the common electrode CE, high transmissivity is obtained in the whole electrode gap between the pixel electrode PE and the common electrode CE.

In addition, although the main common electrode CAL located right above the first source line S1 and the main common electrode CAR located right above the source line S2 counter with the black matrix BM, respectively, both the main common electrode CAL and the main common electrode CAR have the width equal to or less than the black matrix BM in the first direction X, and do not extend to the pixel electrode PE side beyond the overlapped region with the black matrix BM. For this reason, the aperture portion AP which contributes to the display in each pixel corresponds to the regions between the pixel electrode PE and the main common electrode CAL and between the pixel electrode PE and the main common electrode CAR among the regions between the black matrixes BM or between the source line S1 and the source line S2.

As mentioned above, in this embodiment, the auxiliary capacitance line C branches along with the source line S, and the width in the second direction Y of the trunk portion STM of the auxiliary capacitance line C is designed to the minimum width required for forming the contact holes CH1 and CH2. Therefore, the width of the contact portion PC of the pixel electrode PE in the second direction Y can be also made small, and the length D1 in the second direction Y of the main pixel electrode PA can be enlarged.

Figure 6:
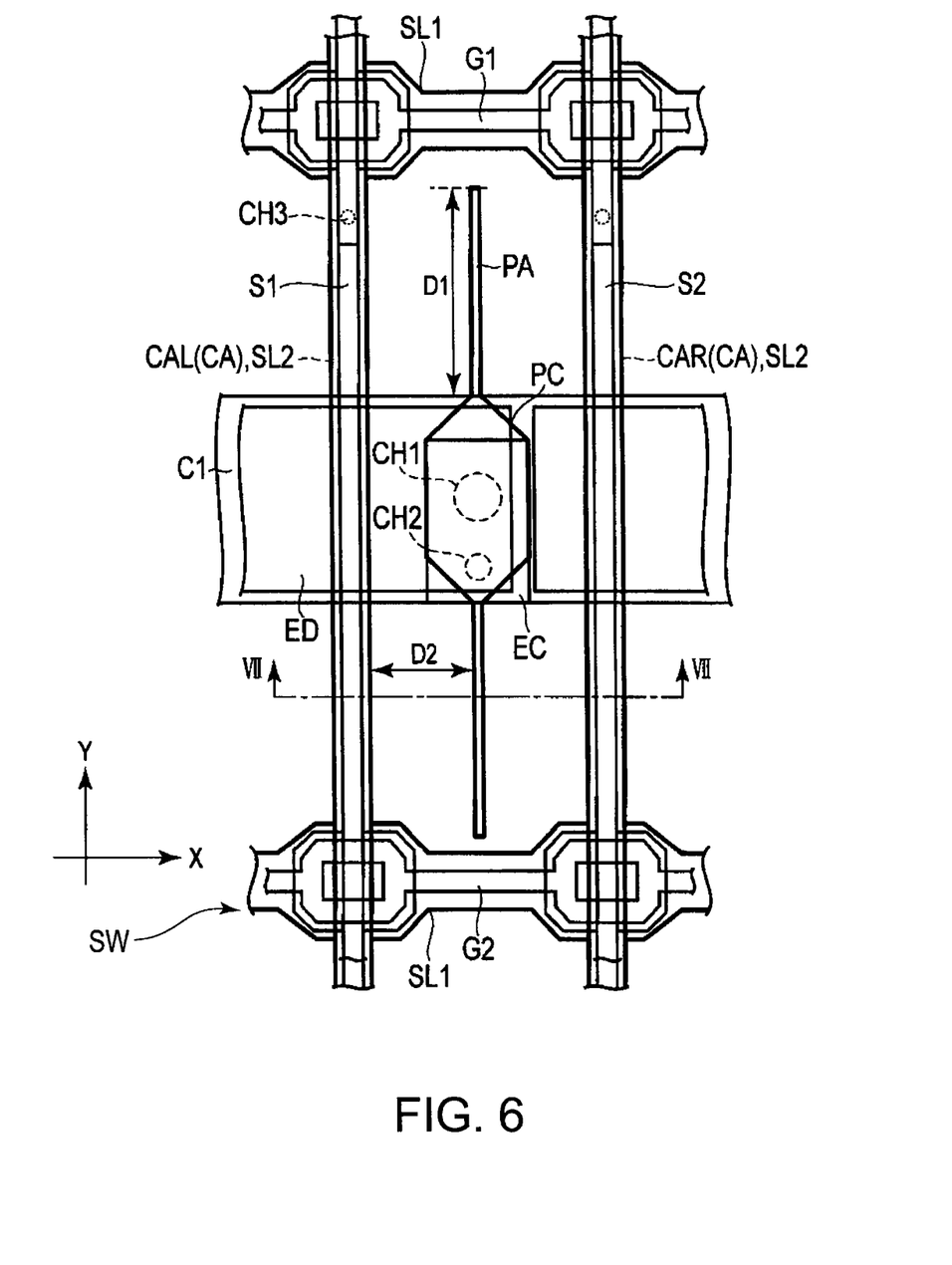
FIG. 6 is a plan view schematically showing a structure of a pixel when a display panel is seen from a counter substrate side according to a comparative example.

FIG. 6 is a plan view schematically showing a structure of one pixel when the display panel is seen from the counter substrate side according to a comparative example. In addition, in the following explanation, the same mark is attached to the same structure as the first embodiment, and explanation thereof is omitted.

In this example, the auxiliary capacitance line C1 is not equipped with the branch portion BRC. Namely, the auxiliary capacitance line C1 extends in the first direction X between the gate line G1 and the gate line G2.

The drain line ED of the switching element SW extends to a region under the auxiliary capacitance line C1 along the source line S1. The drain line ED extends in the first direction X so that the drain line ED may counter with the auxiliary capacitance line C1.

On the both sides of the pixel electrode PE in the first direction X, the main common electrode CA extends substantially in the second direction Y. Also in the comparative example, like the first embodiment, the main common electrode on the left-hand side in the figure is called CAL, and the main common electrode on the right-hand side in the figure is called CAR. The main common electrode CAL counters with the source line S1, and the main common electrode CAR counters with the source line S2. The width in the first direction X of the main common electrode CA is larger than the width of the source line S1 and the second source line of S2.

Figure 7:
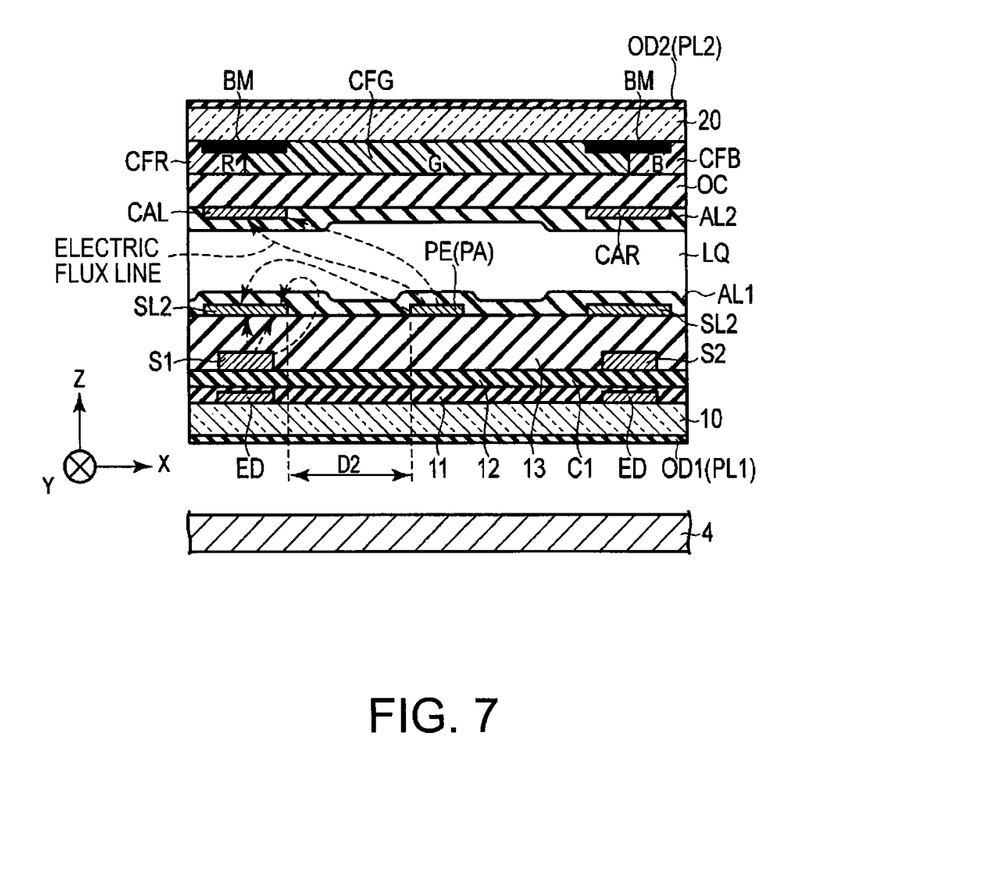
FIG. 7 is a cross-sectional view schematically showing the structure of the liquid crystal display panel taken along line VII-VII shown in FIG. 6.

FIG. 7 is a cross-sectional view schematically showing the structure of the liquid crystal display panel taken along line VII-VII shown in FIG. 6.

In the liquid crystal display panel according to the comparative example, as shown in FIG. 7, the electric field leak from the source line S may affect the alignment state of the liquid crystal molecule LM, and cross-talk phenomenon may occur. In this comparative example, the shield layer SL2 is arranged right above the source line S, and the electric field leak from the source line S is controlled. However, in order to fully acquire the effect of the shield layer SL2, the width of the shield layer SL2 in the first direction X is needed to be enlarged. When the width of the shield layer SL2 in the first direction X is enlarged, transmissivity may fall and display grace may also fall.

On the other hand, in the liquid crystal display device according to the above-mentioned first embodiment, though the width of shield layer SL2 in the first direction X is enlarged to suppress the influence by the electric field leak from the source line S and to eliminate the cross-talk, transmissivity does not fall. It is because the width of the trunk portion STM of the auxiliary capacitance line C in the second direction Y is made small by forming the auxiliary capacitance so that the auxiliary capacitance line C counter the drain line ED under the shield layer SL2.

Although the horizontal inter-electrode distance D2 in the first embodiment becomes small, the main pixel electrode length D1 can be enlarged. Specifically, the main pixel electrode length D1 in first embodiment can be made respectively larger, about 3 μm (total 6 μm for upper portion and the lower portion of the pixel) than the main pixel electrode length D1 in the comparative example.

Since the aperture area which decreases when the horizontal inter-electrode distance D2 becomes small is substantially the same as the aperture area which increases when the main pixel electrode length D1 is enlarged, the total aperture area is not changed as a result. However, since transmissivity is high in the central portion of the aperture and becomes low closing to the end of the aperture, it becomes possible to make the transmissivity higher comparing with the comparative example. That is, although there is no aperture ratio improvement in the liquid crystal display device according to the first embodiment, alignment uniformity of the liquid crystal material can be improved and the light modulation rate of the liquid crystal layer LQ can be also improved. The transmissivity of the liquid crystal display device according to the first embodiment was improved by 1.07 times comparing with the transmissivity of the liquid crystal display device according to the comparative example.

According to this embodiment, it becomes possible to control decrease in transmissivity. Thereby, it becomes possible to control degradation of display grace.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrodes CA in order to make transmissivity of each pixel high enough. In addition, in the product specifications in which the pixel pitch differs each other, the peak condition of the transmissivity distribution can be used by changing the inter-electrode distance, i.e., by changing the arrangement location of the main common electrode CA with respect to the pixel electrode PE arranged in the center of the pixel PX. That is, in the display mode according to this embodiment, it becomes possible to supply the display device having various pixel pitches by setting up inter-electrode distance between the main pixel electrode PE and the main common electrode CA corresponding to the product specification from low resolution with a comparatively large pixel pitch to high resolution with a comparatively small pixel pitch without necessarily using microscopic processing. Therefore, it becomes possible to correspond to the demand for high transmissivity and high resolution easily.

In addition, according to this embodiment, the transmissivity fully falls in the region which overlaps with the black matrix BM. This is because the electric field leak does not occur outside of the pixel from the common electrode CE, and undesired lateral electric field is not produced between the adjoining pixels on the both sides of the black matrix BM. That is, it is because the liquid crystal molecule in the region which overlaps with the black matrix BM maintains the state of the initial alignment like at the OFF time (or the time of the black display). Therefore, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arise in the inter-electrode distance D2 between the pixel electrode PE and the respective common electrodes CE sandwiching the pixel electrode PE in the first direction X. However, the alignment shift is produced in common to all the pixels PX, there is no difference in the electric field distribution between the pixels PX, and the influence to the display is negligible. Even if the assembling shift arises between the array substrate AR and the counter substrate CT, it becomes possible to control the undesirable electric field leak to the adjoining pixels. For this reason, even if it is in a case where the colors of the color filters differ between the adjoining pixels, it becomes possible to control generating of mixed colors, and also becomes possible to control the fall of color reproducibility and the contrast ratio.

In this embodiment, the main common electrodes CA counter with the source lines S, respectively. In the case where the main common electrodes CAL and CAR are arranged above the source lines S1 and S2, respectively, the aperture portion AP which contributes to the display can be expanded as compared with the case where the main common electrodes CAL and CAR are arranged on the pixel electrode PE side rather than above the source lines S1, and S2. Accordingly, it becomes possible to improve the transmissivity of the pixel PX.

Moreover, it becomes possible to expand the inter-electrode distances between the pixel electrode PE and the main common electrode CAL, and between the pixel electrode PE and the main common electrode CAR in the first direction X, by arranging the main common electrodes CA above the source lines S1, and S2, respectively, and also becomes possible to form more horizontal electric field closer to the horizontal direction. For this reason, it also becomes possible to maintain the wide viewing angle which is one of advantages of the general IPS mode.

Moreover, according to this embodiment, it becomes possible to form a plurality of domains in each pixel. For this reason, the viewing angle can be optically compensated in a plurality of directions, and the wide viewing angle is attained.

In addition, in the above-mentioned embodiment, the initial alignment direction of the liquid crystal molecule LM is in parallel with the second direction Y. However, the initial alignment direction of the liquid crystal molecule LM may be an oblique direction D which obliquely crosses the second direction Y as shown in FIG. 2A. Herein, an angle θ1 which the initial alignment direction D makes with the second direction Y is larger 0° and smaller than 45°. In addition, it is extremely effective to set the angle θ1 in the range of 5° to 30°, more preferably less than 20° in a viewpoint of the alignment control of the liquid crystal molecule LM. That is, it is preferable that the initial alignment direction of the liquid crystal molecule LM is set to a direction substantially in parallel with the direction in the range of 0° to 20° with respect to the second direction Y.

Moreover, although the above-mentioned example explains about the case where the liquid crystal layer LQ has positive dielectric constant anisotropy, the liquid crystal layer LQ may have negative dielectric constant anisotropy. Although detailed explanation is omitted, when the negative type liquid crystal material is used, it is preferable that the above-mentioned angle θ1 is made in the range of 45° to 90°, and more preferably not less than 70°.

Furthermore, even at the time of ON, since the lateral electric field is hardly formed (or sufficient electric field to drive the liquid crystal molecule LM is not formed) on the pixel electrode PE or the common electrode CE, the liquid crystal molecule LM hardly moves from the initial alignment direction like at the time of OFF. For this reason, even if the pixel electrode PE and the common electrode CE are formed of the electric conductive material with the light transmissive characteristics, the backlight hardly penetrates, and also hardly contributes to the display at the time of ON. Therefore, the pixel electrode PE and the common electrode CE do not necessarily need to be formed of a transparent electric conductive material, and may be formed using non-transparent electric conductive materials, such as aluminum (Al), silver (Ag), and copper (Cu).

Next, the liquid crystal display device according to a second embodiment is explained in detail with reference to figures.

Figure 4:
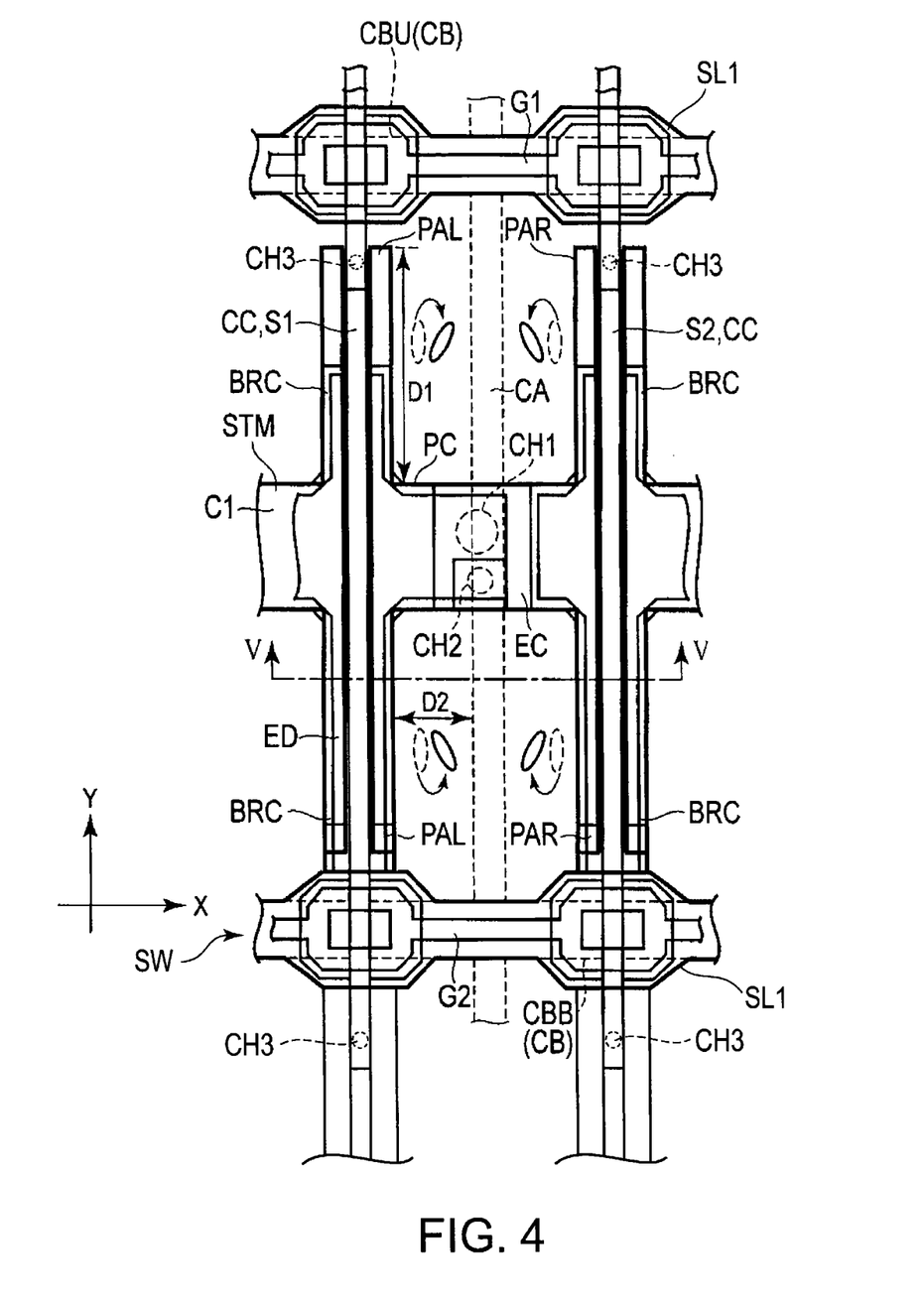
FIG. 4 is a plan view schematically showing a structure of a pixel when the display panel shown in FIG. 1 is seen from a counter substrate side according to a second embodiment.

FIG. 4 is a plan view schematically showing a structure of a pixel when the display panel LPN shown in FIG. 1 is seen from the counter substrate side according to a second embodiment. In this embodiment, the structure of the pixel electrode PE and the common electrode CE differs from the above-mentioned first embodiment. Hereinafter, different structure from the liquid crystal display device according to the first embodiment is mainly explained, and the explanation about the same structure as the liquid crystal display device according to the first embodiment is omitted.

The pixel electrode PE is arranged between the source line S1 and the source line S2, and between the gate line G1 and the gate line G2. The pixel electrode PE is equipped with a contact portion PC and a main pixel electrode PA extending along the second direction Y from contact portion PC.

The contact portion PC is arranged in a position in which the contact portion PC faces the auxiliary capacitance line C1. The contact portion PC is electrically connected with the drain line ED by the contact holes CH1 and CH2 through the contact electrode EC. The width of the contact portion PC in the second direction Y has the minimum size required for forming the contact holes CH1 and CH2 which electrically connect the pixel electrode PE with the switching element SW.

The main pixel electrode PA extends in the second direction Y near the end of the pixel PX in the first direction X. That is, the main pixel electrode PA is equipped with the main pixel electrode PAL extending in the second direction Y so as to adjoin the source line S1, and the main pixel electrode PAR extending in the second direction Y so as to adjoin the source line S2. The main pixel electrode PAL extends along the second direction Y from the end of the contact portion PC in the first direction X. The main pixel electrode PAR extends along the second direction Y from the other end of the contact portion PC in the first direction. That is, the main pixel electrode PAL and the main pixel electrode PAR are electrically connected with the contact portion PC extending therebetween.

The branch portion BRC of the auxiliary capacitance line C1 arranged under the source line S1 counters with portions of the pixel electrodes PAR and PAL arranged adjacent to the source line S1.

The common electrode CE is equipped with a main common electrode CA, a sub-common electrode CB, and a shield layer CC. The main common electrode CA, the sub-common electrode CB, and the shield layer CC are formed integrally or continuously.

The main common electrode CA extends in the second direction Y between the main pixel electrode PAR and the main pixel electrode PAL, facing the contact portion PC. The distances between the main common electrode CA and the main pixel electrode PAL, and between the main common electrode CA and the main pixel electrode PAR is substantially same in the first direction X.

The sub-common electrodes CB extend in the first direction X on both sides sandwiching the pixel electrode PE in the second direction Y. The sub-common electrode CB counters with each of the gate lines G. The sub-common electrodes CB are arranged in two lines along the first direction X in this embodiment. Hereinafter, in order to distinguish the sub-common electrodes CB, the sub-common electrode CB arranged on the upper side of the pixel PX is called a sub-common electrode CBU and the sub-common electrode arranged on the lower side of the pixel PX is called a sub-common electrode CBB. The sub-common electrode CBU is arranged at the upper portion end of the pixel PX, and counters with the gate line G1. That is, the sub-common electrode CBU is arranged striding over a boundary between the illustrated pixel and a pixel adjoining the illustrated pixel PX on its upper portion. Moreover, the sub-common electrode CBB is arranged at the bottom end of the pixel PX, and counters with the gate line G2. That is, the sub-common electrode CBB is arranged striding over a boundary between the illustrated pixel and an adjoining pixel PX on its bottom side.

The shield layer CC is formed on the counter substrate CT extending in the second direction Y. The shield layer CC is arranged so as to be sandwiched by the adjacent pixel electrodes PE in the first direction X. The shield layer CC counters with each of source lines S. In this embodiment, the shield layer CC is arranged in two lines along the source lines in each pixel. The shield layer CC is arranged striding over a boundary between the adjoining pixels in the first direction X.

If its attention is paid to the positional relationship between the pixel electrode PE and the common electrode CE, the main pixel electrode PAR and the main pixel electrode PAL of the adjacent pixels PX, and the main common electrode CA are arranged by turns along the first direction X, and the contact portion PC and the sub-common electrodes CB are arranged by turns along the second direction Y. That is, between the adjoining main common electrodes CA, one pair of main pixel electrodes PAL and the main pixel electrode PAR are located, and the main pixel electrode PAL, the main common electrode CA, and the main pixel electrode PAR are arranged along the first direction X in this order. The shield layer CC is arranged between the pair of main pixel electrodes PAL and PAR facing the source line S. Moreover, one contact portion PC is arranged between the adjoining sub-common electrode CBB and the sub-common electrode CBU. The sub-common electrode CBB, contact portion PC, and the sub-common electrode CBU are arranged along the second direction Y in this order.

Figure 5:
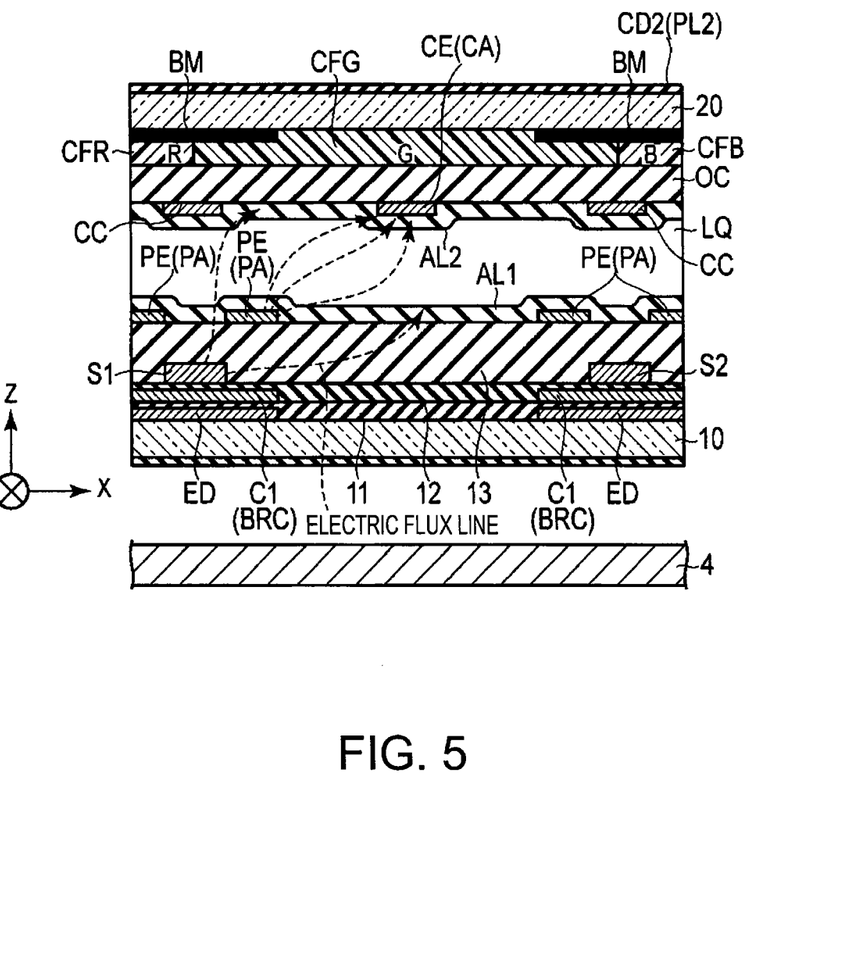
FIG. 5 is a cross-sectional view schematically showing the structure of the liquid crystal display panel taken along line V-V shown in FIG. 4.

FIG. 5 is a cross-sectional view schematically showing the structure of the liquid crystal display panel taken along line V-V shown in FIG. 4. In addition, only the portion required for explanation is illustrated here.

The back light 4 is arranged on the back side of the array substrate AR which constitutes the liquid crystal display panel LPN.

The drain line ED is formed on the first insulating substrate 10, and covered with the first interlayer insulating film 11. The auxiliary capacitance line C1 is formed on the first interlayer insulating film 11, and covered with the second interlayer insulating film 12. The source line S is formed on the second interlayer insulating film 12, and covered with the third interlayer insulating film 13. In addition, the gate line which is not illustrated is arranged in the same layer as the auxiliary capacitance line C1, for example.

The pixel electrode PE is formed on the third interlayer insulating film 13. The pixel electrode PE is located between the adjoining source lines S rather than the position right above the adjoining source lines S. That is, the main pixel electrode PAL is arranged near the source line S1, and the main pixel electrode PAR is arranged near the source line S2. The main pixel electrode PAL and the main pixel electrode PAR are arranged facing the auxiliary capacitance line C1.

The first alignment film AL1 is arranged on the array substrate AR facing the counter substrate CT, and extends to whole surface of the active area ACT. The first alignment film AL1 is formed of material which shows a horizontal alignment characteristics.

In addition, the array substrate AR may be further equipped with a portion of the common electrodes CE. In this embodiment, a shield layer SL1 (shown in FIG. 4) which is a portion of the common electrodes CE is arranged on the third interlayer insulating film 13 so as to counter with the gate line G.

The counter substrate CT is formed using a second insulating substrate 20 which has a transmissive characteristics. The counter substrate CT includes a black matrix BM, a color filter CF, an overcoat layer OC, a common electrode CE, and a second alignment film AL2, etc.

The black matrix BM forms an aperture portion AP by defining each pixel PX. That is, the black matrix BM is arranged so that wiring portions, such as the source line S, the gate line G, the auxiliary capacitance line C, and the switching element SW, may counter the black matrix BM. Herein, though only a portion of the black matrix BM extending along the second direction Y is shown, the black matrix BM may include a portion extending along the first direction X. The black matrix BM is formed on an internal surface 20A of the second insulating substrate 20 facing the array substrate AR.

The common electrode CE is formed on the overcoat layer OC facing the array substrate AR. The distance between the common electrode CE and the pixel electrode PE along a third direction Z is uniform. The third direction Z is a direction which crosses the first direction X and the second direction Y, i.e., a normal line direction of the liquid crystal display panel LPN.

The second alignment film L2 is arranged on the counter substrate CT facing the array substrate AR and extends to whole active area ACT. The second alignment film L2 is formed of the material which shows horizontal alignment characteristics.

An alignment treatment (for example, rubbing processing or light alignment processing) is performed to the first alignment film AL1 and the second alignment film AL2 to initially align the molecules of the liquid crystal layer LQ. A first alignment treatment direction PD1 in which the first alignment film AL1 initially aligns the molecules is in parallel with, and the same or opposite direction to a second alignment treatment direction PD2 in which the second alignment film AL2 initially aligns the molecules. For example, the first alignment treatment direction PD1 and the second alignment treatment direction PD2 are in parallel with the second direction Y and the same directions each other as shown in FIG. 2.

According to above structure, the liquid crystal molecule LM which was initially aligned in the second direction Y at the time of OFF is affected by electric field formed between the pixel electrode PE and the common electrode CE at the time of ON, and the long axis shown with the solid line in the figure rotates within the X-Y plane.

The liquid crystal molecule LM in the region surrounded with the main pixel electrode PAL, the contact portion PC, the main common electrode CA, and the sub-common electrode CBB rotates counterclockwise to the second direction Y, and the liquid crystal molecule LM is aligned so that it may turn to the lower right in the figure. The liquid crystal molecule LM in the region surrounded with the pixel electrode PAR, the contact portion PC, the main common electrode CA, and the sub-common electrode CBB rotates clockwise to the second direction Y, and the liquid crystal molecule LM is aligned so that it may turn to the lower left in the figure. The liquid crystal molecule LM in the region surrounded with the main pixel electrode PAL, the contact portion PC, the main common electrode CA, and the sub-common electrode CBU rotates clockwise to the second direction Y, and the liquid crystal molecule LM is aligned so that it may turn to the upper right in the figure. The liquid crystal molecule LM in the region surrounded with the main pixel electrode PAR, the contact portion PC, the main common electrode CA, and the sub-common electrode CBU rotates counterclockwise to the second direction Y, and the liquid crystal molecule LM is aligned so that it may turn to the upper left in the figure.

In the liquid crystal display device according to the above-mentioned second embodiment, the main pixel electrode PA is arranged near the source line S to suppress the influence to the alignment state of the liquid crystal molecule LM by electric field leak from the source line S. Thereby, the cross-talk is avoided. That is, the main pixel electrode PA operates also as a shield layer which shields electric field leak from the source line S. Furthermore, in this embodiment, the cross-talk between adjoining pixels in the first direction X can be improved by the shield layer CC, and degradation of the display grace can be controlled.

In the liquid crystal display device according to the second embodiment, the auxiliary capacitance is formed along the source line S by branching the auxiliary capacitance line C along the source line S so as to face the drain line ED. Thereby, the width in the second direction Y of the trunk portion STM of the auxiliary capacitance line C is made small. Although the horizontal inter-electrode distance D2 becomes small, the main pixel electrode length D1 can be enlarged like the first embodiment. Specifically, the main pixel electrode length D1 in first embodiment can be made respectively larger, about 3 μm (total 6 μm for upper portion and the lower portion of the pixel) than the main pixel electrode length D1 in the comparative example.

Since the aperture area which decreases when the horizontal inter-electrode distance D2 becomes small is substantially the same as the aperture area which increases when the main pixel electrode length D1 is enlarged, the total aperture area is not changed as a result. However, since transmissivity is high in the central portion of the aperture and becomes low closing to the end of the aperture, it becomes possible to make the transmissivity high comparing with the comparative example. That is, although there is no aperture ratio improvement in the liquid crystal display device according to the second embodiment like the first embodiment, alignment uniformity of the liquid crystal material can be improved and the light modulation rate of the liquid crystal layer LQ can be also improved. The transmissivity of the liquid crystal display device according to the second embodiment was improved by 1.07 times comparing with the transmissivity of the liquid crystal display device according to the comparative example.

According to this embodiment, it becomes possible to control decrease in transmissivity. Thereby, it becomes possible to control degradation of display grace.

Moreover, in the liquid crystal display device according to this embodiment, electric field leak from the source line S is shielded with the main pixel electrode PA arranged on the source line S, and generating of the cross-talk can be controlled. Furthermore, since the shield layer is not arranged on the source line S, load for driving the source line S can be reduced, and power consumption can be also kept low. Moreover, the liquid crystal display device according to this embodiment can be applied even to a high definition display.

As explained above, according to the embodiments, it becomes possible to supply the liquid crystal display device which can control degradation of display grace.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
an array substrate including;
a gate line extending in a first direction,
a source line extending in a second direction orthogonally crossing the first direction,
an auxiliary capacitance line having a trunk portion extending in the first direction so as to cross the source line and a branch portion branched from the trunk portion and extending along the source line,
a switching element formed in a region in which the source line crosses the gate line each other, the switching element including a drain line extending under the source line and arranged under the auxiliary capacitance line so as to face the trunk portion and the branch portion thereof, and
a pixel electrode having a main pixel electrode extending substantially in parallel to the source line and a contact portion electrically connected with the drain line,
a counter substrate having a couple of main common electrodes extending substantially in parallel to the main pixel electrode on the both sides sandwiching the main pixel electrode; and
a liquid crystal layer held between the array substrate and the counter substrate and containing liquid crystal molecules.

2. The liquid crystal display device according to claim 1, wherein the array substrate includes a first shield layer arranged on the source line.

3. The liquid crystal display device according to claim 2, wherein the width of the first shield layer in the first direction is substantially equal to the width of the branch portion of the auxiliary capacitance line.

4. The liquid crystal display device according to claim 1, wherein the main common electrode is arranged facing the source line.

5. The liquid crystal display device according to claim 1, wherein the width of the main common electrode in the first direction is substantially equal to the width of the branch portion of the auxiliary capacitance line.

6. The liquid crystal display device according to claim 1, wherein the contact portion is arranged facing the trunk portion of the auxiliary capacitance line, and the main pixel electrode extends from the contact portion.

7. The liquid crystal display device according to claim 1, wherein the counter substrate includes a second shield layer facing the gate line.

8. The liquid crystal display device according to claim 1, wherein the liquid crystal molecules are aligned in a splay alignment state or a homogeneous alignment state in a state where an electric field is not formed between the pixel electrode and the main common electrode.

9. The liquid crystal display device according to claim 1, wherein
the array substrate further includes a first alignment film covering the pixel electrode, and the counter substrate further includes a second alignment film covering the main common electrode,
the liquid crystal molecules near the first alignment film is initially aligned in a first alignment treatment direction,
the liquid crystal molecules near the second alignment film is initially aligned in a second alignment treatment direction, and
the first and second alignment treatment directions are in parallel and the same directions each other.

10. The liquid crystal display device according to claim 1, further comprising a first polarization plate arranged on an outer surface of the array substrate and a second polarization plate arranged on an outer surface of the counter substrate, wherein
a first polarizing axis of the first polarization plate orthogonally crosses a second polarizing axis of the second polarization plate, and
the first polarizing axis of the first polarization plate orthogonally crosses or in parallel with an initial alignment direction of the liquid crystal molecules.

11. A liquid crystal display device, comprising:
an array substrate including;
a gate line extending in a first direction,
a source line extending in a second direction orthogonally crossing the first direction,
an auxiliary capacitance line having a trunk portion extending in the first direction so as to cross the source line and a branch portion branched from the trunk portion and extending along the source line,
a switching element formed in a region in which the source line crosses the gate line each other, the switching element including a drain line extending under the source line and arranged under the auxiliary capacitance line so as to face the trunk portion and the branch portion thereof, and
a pixel electrode having a main pixel electrode extending in parallel to the source line so as to adjoin the source line and a contact portion electrically connected with the drain line, a portion of the main pixel electrode facing the branch portion of the auxiliary capacitance line through an insulating layer,
a counter substrate including a common electrode having a main common electrode extending substantially in parallel to the main pixel electrode and facing the contact portion of the pixel electrode; and
a liquid crystal layer held between the array substrate and the counter substrate and containing liquid crystal molecules.

12. The liquid crystal display device according to claim 11, wherein the counter substrate includes a shield layer facing the source line.

13. The liquid crystal display device according to claim 11, wherein
the common electrode includes a sub-common electrode facing the gate line.

14. The liquid crystal display device according to claim 11, wherein the liquid crystal molecules are aligned in a splay alignment state or a homogeneous alignment state in a state where an electric field is not formed between the pixel electrode and the main common electrode.

15. The liquid crystal display device according to claim 11, wherein
the array substrate further includes a first alignment film covering the pixel electrode, and the counter substrate further includes a second alignment film covering the common electrode,
the liquid crystal molecules near the first alignment film is initially aligned in a first alignment treatment direction,
the liquid crystal molecules near the second alignment film is initially aligned in a second alignment treatment direction, and
the first and second alignment treatment directions are in parallel and the same directions each other.

16. The liquid crystal display device according to claim 11, further comprising a first polarization plate arranged on an outer surface of the array substrate and a second polarization plate arranged on an outer surface of the counter substrate, wherein
- a first polarizing axis of the first polarization plate orthogonally crosses a second polarizing axis of the second polarization plate, and
- the first polarizing axis of the first polarization plate orthogonally crosses or in parallel with an initial alignment direction of the liquid crystal molecules.

* * * * *